No. 793,558. Patented June 27, 1905.

UNITED STATES PATENT OFFICE.

OSCAR BALLY, OF MANNHEIM, AND HUGO WOLFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

ANTHRACENE DYE AND PROCESS OF MAKING SAME.

SPECIFICATION forming part of Letters Patent No. 793,558, dated June 27, 1905.

Application filed January 7, 1905. Serial No. 240,108.

*To all whom it may concern:*

Be it known that we, OSCAR BALLY, a citizen of the Swiss Republic, residing at Mannheim, in the Grand Duchy of Baden, and HUGO WOLFF, a subject of the Grand Duke of Baden, residing at Ludwigshafen-on-the-Rhine, in the Kingdom of Bavaria, German Empire, have invented new and useful Improvements in Anthracene Coloring-Matters and Processes of Producing the Same, of which the following is a specification.

This invention relates to the manufacture of new coloring-matters of the anthracene series.

If hydroxyanthraquinones—such as monohydroxyanthraquinone, alizarin, quinizarin, and also polyhydroxyanthraquinones and the derivatives of these bodies, in particular their hydro derivatives, such as beta-hydroxyanthranol and leuco quinizarin—be condensed with glycerin, new coloring-matters are obtained which dye mordanted material, yielding different shades from those obtained from the initial materials. The condensation can best be effected in sulfuric-acid solution and proceeds most readily when the hydro derivatives of the hydroxyanthraquinones are used. The same condensation products are obtained in the latter case as when using the hydroxyanthraquinones themselves. When these latter are used, it is advantageous to add a reducing agent—such as ferrous sulfate, anilin sulfate, zinc, or tin—to the melt.

The following examples will serve to further illustrate the method of carrying our invention into practical effect; but the invention is not limited to these examples. The parts are by weight.

Example 1: Dissolve two (2) parts of alpha-hydroxyanthraquinone in fifty (50) parts of sulfuric acid containing about eighty-two (82) per cent. of $H_2SO_4$ and add four (4) parts of glycerin and three (3) parts of anilin sulfate. Heat the mixture carefully for one (1) hour at a temperature of one hundred and fifty degrees centigrade, (150° C.,) and after cooling pour the red-brown liquid into water and filter, wash, and press the product, which separates out in green flakes. When dry, it forms a green powder, a part of which is soluble in alcohol and can be crystallized from dilute alcohol, yielding yellow needles, which are soluble in concentrated sulfuric acid, giving a yellow solution with a green fluorescence. They are difficultly soluble in cold dilute caustic-soda solution, but more easily soluble on warming, giving a yellow solution.

Example 2: Dissolve in twenty-five (25) parts of sulfuric acid, containing about eighty-two (82) per cent. of $H_2SO_4$, one (1) part of beta-hydroxyanthranol (such as can be obtained by reducing beta-hydroxyanthraquinone with zinc-dust in dilute ammonia solution) and add two (2) parts of glycerin. Heat this mixture for one (1) hour at a temperature of one hundred and fifty degrees centigrade (150° C.) and after cooling pour into water. The products so obtained consists of a green-yellow powder, which on being crystallized from alcohol and from xylol can be obtained in small yellow crystals, which melt at a temperature of two hundred and ninety-one degrees centigrade (291° C.) and which on being analyzed yield results indicating that the compound is beta-hydroxybenzanthrone. The pure compound dissolves in concentrated sulfuric acid, yielding a yellow solution with a green fluorescence. It also dissolves in dilute caustic-soda solution, giving also in this case a yellow solution with a green fluorescence.

Example 3: Condense ten (10) parts of alizarin with glycerin in the manner described in the preceding Example 1. The condensation product consists of a green powder, which on crystallization from alcohol can be obtained in yellow crystals, which dissolve in concentrated sulfuric acid, yielding a red-yellow solution with a green-brown fluorescence and which also dissolve in dilute caustic-soda solution, giving a yellow-brown solution with a strong green fluorescence. This condensation product dyes alumina-mordanted fiber, giving yellow-brown shades. In a similar manner other hydroxyanthraquinones and their derivatives can be condensed with glycerin.

The new products thus obtained are regarded as hydroxybenzanthrones and upon analysis are seen to possess a composition corresponding to this constitution.

Now what we claim is—

1. The process for the production of new anthracene dyes called "hydroxybenzanthrones" by condensing a hereinbefore-defined anthracene body with glycerin.

2. The process for the manufacture of new anthracene dyes called "hydroxybenzanthrones" by condensing a hereinbefore-defined anthracene body with glycerin in the presence of sulfuric acid.

3. The process for the production of new anthracene dyes called "hydroxybenzanthrones" by condensing alizarin with glycerin.

4. The process for the manufacture of new anthracene dyes called "hydroxybenzanthrones" by condensing alizarin with glycerin in the presence of sulfuric acid.

5. As new articles of manufacture the anthracene dyes called "hydroxybenzanthrones" such as can be obtained by condensing a hereinbefore-defined anthracene body with glycerin, which dye mordanted fiber, are soluble in concentrated sulfuric acid yielding reddish to yellowish fluorescent solutions, and are soluble in dilute caustic soda giving yellowish to brownish solutions.

6. As new articles of manufacture the anthracene dyes called "hydroxybenzanthrones" such as can be obtained by condensing alizarin with glycerin, which dye fiber mordanted with alumina giving yellow-brown shades, which dissolve in concentrated sulfuric acid yielding reddish-yellow solutions with a green-brown fluorescence, and are soluble in dilute caustic soda giving yellow-brown solutions with a green fluorescence.

In testimony whereof we have hereunto set our hands in the presence of two subscribing witnesses.

OSCAR BALLY.
HUGO WOLFF.

Witnesses:
ERNEST G. ERHARDT,
JOS. H. LEUTE.